Aug. 22, 1944.  J. P. BARRY ET AL  2,356,198

GUARD

Filed Feb. 12, 1944

INVENTORS
JOHN P. BARRY AND
CLEVELAND C. AVERY
BY
D. Verker Smythe
ATTORNEYS

Patented Aug. 22, 1944

2,356,198

UNITED STATES PATENT OFFICE 2,356,198

GUARD

John P. Barry, Stratford, and Cleveland C. Avery, Fairfield, Conn., assignors to Remington Arms Company, Inc., Bridgeport, Conn., a corporation of Delaware Application February 12, 1944, Serial No. 522,056

14 Claims. (Cl. 279—110)

The present invention relates to a chuck guard, particularly a structure constituting a cooperative part of the chuck, and has for an object to provide guard means cooperatively carried in relation to the movable chuck jaws and adapted to keep shavings and other extraneous materials from entering the spaces between the jaws. A further object is to provide a protective guard structure of substantially continuous circumferential form, free from sharp projecting surfaces, to the end that the hands of the worker will be protected from injury in the event that they come into contact with the rotating chuck.

Another object is to provide guard means carried by the radially movable chuck jaws, and cooperating with circumferential guard means carried by the chuck body, providing a complete endwise and circumferential closure about the movable chuck jaws having a central work-receiving opening adapted to expand or contract in correspondence with the opening and closing movement of the chuck jaws, so that irrespective of the size of the work piece held within the chuck jaws the guard means will provide a complete closure extending substantially to the surface of the work piece.

A further object is to provide guard means which may be conveniently and economically incorporated in present types of chucks.

With the above and other objects in view, an embodiment of the invention is shown in the accompanying drawing, and this embodiment will be hereinafter more fully described with reference thereto, and the invention will be finally pointed out in the claims.

In the drawing.

Similar reference characters indicate corresponding parts throughout the several figures of the drawing.

Figure 1:
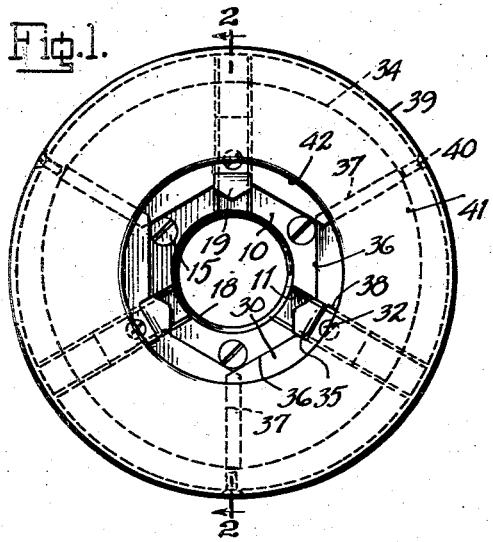
Fig. 1 is a front elevation of a chuck incorporating the chuck guard of the invention, and showing the chuck jaws in their maximum open position.
Figure 2:
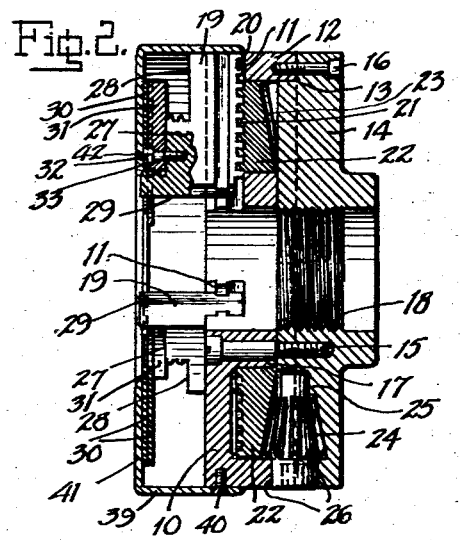
Fig. 2 is a longitudinal sectional view, taken along the line 2—2 of Fig. 1.

Referring to the drawing the chuck illustrated is a universal chuck of the scroll type, wherein three radial chuck jaws are adapted to be simultaneously and equally moved inwardly or outwardly. It will be understood however, that the invention may be incorporated in other suitable types of chucks, as for instance, the combination and independent types, and having any suitable number of jaws. The universal chuck illustrated by way of example comprises a chuck body consisting of a cylindrical face plate 10 provided with three radial chuck jaw slideways 11 opening at their inner ends in the central passage of the chuck body and at their outer ends in the outer periphery, this face plate being provided with a cylindrical peripheral flange 12 extending rearwardly and engaged with a peripheral recess 13 of the back plate 14 secured to the face plate by screws 15 and 16 respectively engaged through the hub portion 17 of the face plate and the peripheral recessed portion 13 of the back plate. The back plate is provided with a central threaded opening 18 for mounting the chuck on a lathe, spindle or the like. The chuck jaws 19 are slideably engaged in the slideways 11 and are provided upon their inner surfaces with scroll teeth 20 meshing with the spiral thread or scroll 21 of the scroll plate 22 rotatably mounted within the chuck body upon the hub portion 17 of the face plate and provided upon its rearward side with bevel teeth 23 engaged by a bevel gear pinion 24 journaled at its inner end in a bearing pocket 25 formed in the back plate, and journaled at its outer end in a split bearing aperture 26 formed upon the meeting surfaces of the peripheral flange 12 of the face plate and recess 13 of the back plate. By turning the pinion the scroll plate is turned, causing the jaws to move inwardly or outwardly.

Figure 3:
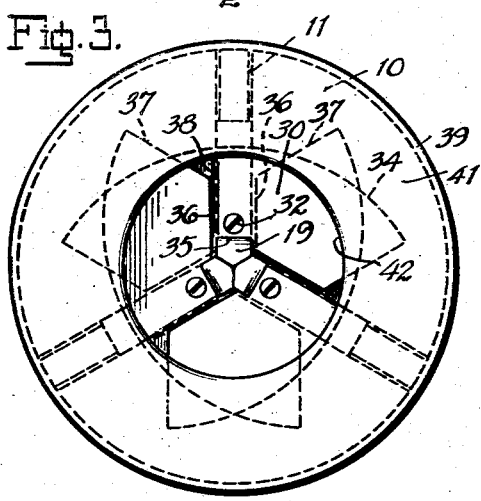
Fig. 3 is a front elevation showing the chuck jaws in their fully closed position.

The forward surface of each of the chuck jaws is provided with shouldered steps 27 and 28, outwardly of the inner work gripping surface 29, the latter being angled at each side of its central work engaging edge at 60° angles, so that in the fully closed position of the chuck jaws, as shown in Fig. 3, the inner ends of the jaws meet with no opening between them.

Upon the step 27 of each chuck jaw there is rigidly secured a guard member in the form of a sheet metal shield plate 30 having a mounting block 31 brazed or otherwise suitably secured to its under side, the guard member being rigidly secured to the jaw, with the inner end of the block 31 engaged against the shoulder at the inner end of the step, by means of a screw 32 engaged through a countersunk hole 33 in the guard member. The plan outline of the shield plate is symmetrical at each side of the jaw, its outer edge 34 being of circumferential form and its inner edge being notched centrally at 35 to extend inwardly at each side about the inner end of the jaw, and extending at each side of the notch in the form of a V having an inner edge portion 36 parallel to one angled side of the jaw and an outer edge portion 37 parallel to the other angled side. The inner edge portions 36 are slightly inset from the end surface of the jaw, so that in the fully closed position, as shown in Fig. 3, these edges of the shield plate of each jaw will be parallel to and slightly spaced from the side surfaces of the other jaws of the chuck.

Figure 4:
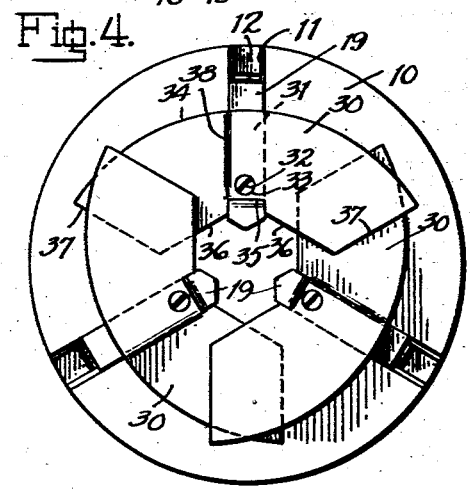
Fig. 4 is a front elevation with the circumferential guard member of the chuck body removed, and showing the chuck jaws in an intermediate open position.
Figure 5:
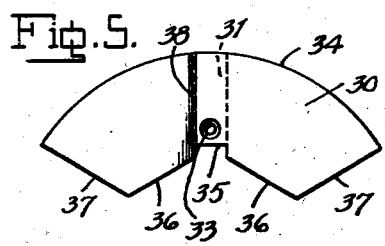
Fig. 5 is a top plan view of one of the chuck jaw guard members detached from the jaw.
Figure 7:
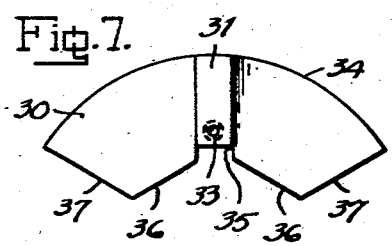
Fig. 7 is a bottom plan view.
Figure 6:
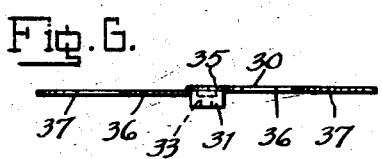
Fig. 6 is an inner edge view thereof.

Along one side of the block 31 the shield plate 30 is downwardly offset by means of a shoulder 38 so that the wing of the shield at the left of the block, as seen in Fig. 5, is in an offset plane from the plane of the right hand wing and the portion of the plate disposed over the block, the offset corresponding approximately to the metal thickness of the plate, so that the upwardly offset wing of the shield plate of one jaw will slideably overlap the downwardly offset wing of the shield plate of the adjacent jaw. The spread of the shield plates is calculated so that in the maximum open position of the chuck, as shown in Fig. 1, the parallel outer edge portions 37 overlap slightly, while in the fully closed position the inner edge portions 36 of the upwardly offset wing of the shield plate of one jaw engages against the shoulder 38 of the shield plate of the adjacent jaw, while the inner edge portion of the downwardly offset wing is disposed in spaced parallel relation to one side surface of the block member 31 of the other adjacent jaw. The arrangement of the shield plates is also such that the exposed shoulders 38 are disposed forwardly with respect to the normal direction of the rotation of the chuck, shown by the arrow in Fig. 4, while the exposed edge portions 36 and 37 are rearwardly, so that the shield plates do not present any projecting structure which might injure the hand of a person touching the rotating chuck.

The chuck jaws and the shield plates carried thereby are enclosed circumferentially and forwardly by a cylindrical cover guard 39 secured by screws 40 about the periphery of the chuck body, so as to cover the outer ends of the slideways 11, its forward wall 41 being in a flat vertical plane and provided with a central aperture 42 engaged by the work gripping ends of the chuck jaws, and of such diameter that it is within the outer circumferential edges of the shield plates in the fully closed position of the chuck jaws, as shown in Fig. 3. The shield plates are in slideable contact with the inner side of the forward guard wall 41, and hence the shield plates and the cover guard cooperate to provide a complete circumferential and forward closure for the chuck jaws in any work gripping position of adjustment. Shavings and chips are prevented from entering the chuck, and the hands of the operator are effectually protected against injury in the event they come into contact with the rotating chuck.

The form of the invention illustrated in the drawing and described herein is typical and illustrative only, and it is evident that the invention is capable of embodiments in other forms, all falling within the scope of the appended claims, which are to be broadly construed.

What is claimed is:

1. A chuck guard for a rotatable chuck having radially movable chuck jaws, comprising a pluraliyt of shield plate members adapted to be respectively secured to the forward sides of each of said chuck jaws, each of said shield plate members adapted to project at each side of the respective chuck jaws into overlapping relation with the respective shield plate members carried by the adjacent chuck jaws.

2. A chuck guard for a rotatable chuck having radially movable chuck jaws, comprising a plurality of shield plate members adapted to be respectively secured to the forward sizes of each of said chuck jaws, each of said shield plate members adapted to project at each side of the respective chuck jaws into overlapping relation with the respective shield plate members carried by the adjacent chuck jaws, the spread of each of said shield plate members being of such extent that the overlapping relation of one with another is maintained between the maximum open position and the fully closed position of said chuck jaws.

3. A chuck guard for a rotatable chuck having radially movable chuck jaws, comprising a plurality of shield plate members adapted to be respectively secured to the forward sides of each of said chuck jaws, each of said shield plate members adapted to project at each side of the respective chuck jaws into overlapping relation with the respective shield plate members carried by the adjacent chuck jaws, the inner edges of said plurality of shield plate members being of angular form and forming an aperture of polygonal outline adapted to be engaged by the work piece held by the chuck jaws and adapted to expand and contract in correspondence with the opening and closing movement of said chuck jaws.

4. A chuck guard for a rotatable chuck having radially movable chuck jaws, comprising a plurality of shield plate members adapted to be respectively secured to the forward sides of each of said chuck jaws, each of said shield plate members adapted to project at each side of the respective chuck jaws into overlapping relation with the respective shield plate members carried by the adjacent chuck jaws, the end edges of each of said shield plate members being parallel to the radial planes of the chuck centrally between the radial planes of movement of the adjacent radially movable chuck jaws.

5. A chuck guard for a rotatable chuck having radially movable chuck jaws, comprising a pluraliay of shield plate members adapted to be respectively secured to the forward sides of each of said chuck jaws, each of said shield plate members adapted to project at each side of the respective chuck jaws into overlapping relation with the respective shield plate members carried by the adjacent chuck jaws, the projecting portion of each of said shield plate members at one side of the respective chuck jaws being downwardly offset in parallel relation to the projecting portion at the other side whereby said downwardly offset portion of each of said shield plate members is superimposed by the overlapping relatively upwardly offset portion of the adjacent shield plate member.

6. A chuck guard for a rotatable chuck having radially movable chuck jaws, comprising a plurality of shield plate members adapted to be respectively secured to the forward sides of each of said chuck jaws, each of said shield plate members adapted to project at each side of the respective chuck jaws into overlapping relation with the respective shield plate members carried by the adjacent chuck jaws, the projecting portion of each of said shield plate members at one side of the respective chuck jaws being downwardly offset a distance corresponding approximately to the thickness of said shield plate members in parallel relation to the projecting portion at the other side whereby said downwardly offset portion of each of said shield plate members is superimposed by the overlapping relatively upwardly offset portion of the adjacent shield plate member.

7. A chuck guard for a rotatable chuck having radially movable chuck jaws, comprising a plurality of shield plate members adapted to be respectively secured to the forward sides of each of said chuck jaws, each of said shield plate members adapted to project at each side of the respective chuck jaws into overlapping relation with the respective shield plate members carried by the adjacent chuck jaws, the projecting portion of each of said shield plate members at one side of the respective chuck jaws being downwardly offset in parallel relation to the projecting portion at the other side whereby said downwardly offset portion of each of said shield plate members is superimposed by the overlapping relatively upwardly offset portion of the adjacent shield plate member, the downwardly offset portion of each of said shield plate members being arranged forwardly with respect to the normal direction of rotation of the chuck.

8. A chuck guard for a rotatable chuck having radially movable chuck jaws, comprising a plurality of guard members adapted to be respectively secured to the forward sides of each of said chuck jaws, and each comprising a mounting block and a shield plate carried thereby and projecting at each side thereof into overlapping relation with the respective shield plates of the guard members carried by the adjacent chuck jaws.

9. A chuck guard for a rotatable chuck having radially movable chuck jaws, comprising a plurality of guard members adapted to be respectively secured to the forward sides of each of said chuck jaws, and each comprising a mounting block and a shield plate carried thereby and projecting at each side thereof itno overlapping relation with the respective shield plates of the guard members carried by the adjacent chuck jaws, the projecting portion of each of said shield plates at one side of each of said mounting blocks being downwardly offset in parallel relation to the portion overlying said mounting block, and the projecting portion at the other side thereof, whereby said downwardly offset portion of each of said shield plates is superimposed by the overlapping relatively upwardly offset portion of the adjacent shield plate.

10. A chuck guard for attachment to the chuck body of a rotatable chuck and to the radially movable chuck jaws carried thereby, comprising a circumferential cover guard member adapted to be secured about the cylindrical periphery of said chuck body and having an inwardly extending centrally apertured front wall portion adapted to extend over the forward sides of the chuck jaws, and a plurality of shield plate members adapted to be respectively secured to the forward sides of each of said chuck jaws within said circumferential guard member, each of said shield plate members adapted to project at each side of the respective chuck jaws into overlapping relation with the respective shield plate members carried by the adjacent chuck jaws.

11. A chuck guard for attachment to the chuck body of a rotatable chuck having radial slideways opening in the outer periphery of the chuck body and having radially movable chuck jaws in said slideways, comprising a circumferential cover guard member adapted to be secured about the cylindrical periphery of said chuck body in overlying relation to the outer open ends of said slideways and having an inwardly extendiny centrally apertured front wall portion adapted to extend over the forward sides of the chuck jaws, and a plurality of shield plate members adapted to be respectively secured to the forward sides of each of said chuck jaws within said circumferential guard member.

12. In combination, a chuck comprising a chuck body and radially movable chuck jaws carried thereby, and a chuck guard comprising a plurality of shield plate members respectively secured to the forward sides of each of said chuck jaws, each of said shield plate members projecting at each side of the respective chuck jaws into overlapping relation with the respective shield plate members carried by the adjacent chuck jaws.

13. In combination, a chuck comprising a chuck body and radially movable chuck jaws carried thereby, and a chuck guard comprising a circumferential cover guard member secured about the periphery of said chuck body and having an inwardly extending centrally apertured front wall portion extending over the forward sides of the chuck jaws, and a plurality of shield plate members respectively secured to the forward sides of each of said chuck jaws within said circumferential guard member, each of said shield plate members projecting at each side of the respective chuck jaws into overlapping relation with the respective shield plate members carried by the adjacent chuck jaws.

14. In a device of the character described, guard means for a chuck having radially movable chuck jaws comprising a circumferential guard member carried by the chuck and surrounding the chuck jaws and overlapping guard members carried by and radially movable with the chuck jaws.

JOHN P. BARRY.
CLEVELAND C. AVERY.